United States Patent
Upp et al.

(10) Patent No.: US 6,792,281 B2
(45) Date of Patent: Sep. 14, 2004

(54) METHOD AND SYSTEM FOR PATCHING DISPATCH CALLING PARTIES TOGETHER

(75) Inventors: Steven D. Upp, Bartlett, IL (US); Peter M. Drozt, Prairie Grove, IL (US); Paul M. Erickson, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/185,958

(22) Filed: Jun. 28, 2002

(65) Prior Publication Data

US 2004/0002351 A1 Jan. 1, 2004

(51) Int. Cl.⁷ ................................................ H04Q 7/20
(52) U.S. Cl. ..................... 455/519; 455/578; 370/390
(58) Field of Search ............................ 455/518, 519, 455/520, 508, 426.1, 54, 466, 521, 414; 370/390, 432, 409

(56) References Cited

U.S. PATENT DOCUMENTS

| | | | |
|---|---|---|---|
| 5,548,631 A | | 8/1996 | Krebs et al. |
| 5,634,197 A | * | 5/1997 | Paavonen .................... 455/512 |
| 5,809,018 A | * | 9/1998 | Lehmusto .................... 370/330 |
| 5,850,611 A | | 12/1998 | Krebs |
| 6,141,347 A | * | 10/2000 | Shaughnessy et al. ...... 370/390 |
| 6,148,064 A | | 11/2000 | Christensen et al. |
| 6,298,058 B1 | * | 10/2001 | Maher et al. ................. 370/390 |
| 2002/0097718 A1 | * | 7/2002 | Korus et al. ................. 370/390 |
| 2002/0186652 A1 | * | 12/2002 | Popovich .................... 370/218 |
| 2002/0197994 A1 | * | 12/2002 | Harris et al. ................. 455/445 |
| 2003/0043772 A1 | * | 3/2003 | Mathis et al. ................ 370/338 |
| 2003/0043804 A1 | * | 3/2003 | Kumar et al. ................ 370/390 |

* cited by examiner

*Primary Examiner*—Nick Corsaro
*Assistant Examiner*—Tan Trinh
(74) *Attorney, Agent, or Firm*—Scott M. Garrett

(57) ABSTRACT

A wireless communication system (402) that provides dispatch communication service, and talk group calling service, supports several talk groups (408, 410). A console (412) operated by a subscribing organization resides outside of the communication system. The console is considered a member of the talk groups, and interacts with the communication system over an internet access, via one or more gateways (416, 418). The gateways operate like base stations that provide the air interface to the mobile communication devices. When the operator of the console wishes to patch the talk groups together, call information received from the first talk group at the console prompts the console to initiate a talk group call for the second talk group. When the second talk group call is set up, the console forwards call information such as identifiers and audio information to the second talk group. This allows the members of the second talk group to participate in talk group calls made in the first talk group.

6 Claims, 3 Drawing Sheets

METHOD AND SYSTEM FOR PATCHING DISPATCH CALLING PARTIES TOGETHER

TECHNICAL FIELD

This invention relates in general to wireless communication and wireless communication systems, and more particularly to dispatch communications involving dispatch calling parties administered by different dispatch communication controllers.

BACKGROUND OF THE INVENTION

There are numerous mobile or wireless communication systems in use today, and these provide a wide variety of modes of communicating. Perhaps the best know today is the cellular radiotelephone communication system. Other systems are also in widespread use, such as trunked radio systems used by public safety and law enforcement agencies. These latter communication systems provide what has been referred to as dispatch communication. Dispatch communication is half-duplex communication, where, when one person is speaking, the other(s) can only listen. This is different than, for example, telephone communication, which is duplex, and both parties in a call can speak and listen simultaneously. Dispatch communication has an advantage in that call set up time is very low, and typically users need to simply press a button to begin talking to the other party or parties. In many typical dispatch communication systems there is a dispatcher that monitors the communication activity, and can facilitate communication among parties. The dispatcher, unlike other parties communicating through the system, typically is in a fixed location. In many of these communication systems users may be grouped together to form talk groups. When any member of the talk group speaks, all the members of the talk group that are available hear the speaker's voice. While the speaker is speaking, no other member can speak to the talk group members, although typically the dispatcher can over-ride the speaker. Conventional trunked radio systems are usually closed systems. That is, they are not open to the public, and are used exclusively by some organization, or perhaps shared by several governmental agencies. As such, the operators of the system have direct access to the communication system equipment. One advantage of having direct access is the ability to patch talk groups together, which is useful under certain conditions, such as emergency management. The drawback of these systems is that they can be extremely expensive to purchase and to operate, and therefore are not cost effective for small businesses and agencies.

The cost of purchasing and operating a dispatch communication system is more than most small organizations are willing or able to spend. This created a need in the marketplace for inexpensive dispatch communication service, and this need has been addressed by communication system operators that provide such service. Specifically, the operators provide both private call dispatch calling, which is half-duplex communication between two individuals, and talk group calling. Typically these services are offered along with mobile telephone service so that with the same mobile communication device a user can engage in any of the three modes of communicating. For talk groups, the user must belong to predefined talk group. To set up a talk group an organization provides a list of users to the communication system operator for each talk group the organization wishes to have. The communication system operator then defines a talk group comprised of these users by creating a talk group record in the communication system. Each mobile communication device is assigned or affiliated with an identifier. These identifiers are used by the communication system to interact with the mobile communication device and provide communication service. Furthermore, the mobile communication devices are designed to be operated much like a two-way radio for private and group dispatch calls. That is, the mobile communication devices are provided with a "push to talk" (PTT) button, and a user interface including a keypad and a display. The user selects the mode of communication, and an identifier or alias associated with the individual or group with whom the user wishes to communicate with, and presses the PTT button. The mobile communication device then sends the information, over the air interface, to the communication system, which sets up the call, locates the call participants, and sends a "ready" message back to the initiating mobile communication device, which then alerts the user that the channel is open and the user may commence speaking. Typically the time from pressing the PTT button to getting the channel open alert takes less than one second. While these communication services have provided a cost-effective alternative to purchasing and operating a dispatch communication system, it doesn't provide the flexibility in configuring communication services that would be needed for small to mid-sized organizations, such as small public safety and emergency organizations. In particular, there is no way for the subscribers to join or patch talk groups together as there is when the organization operates and controls the communication equipment. This is because in the conventional subscriber dispatch communication systems there can be as many as 15 or more dispatch communication controllers servicing an urban area to handle the high number of subscribers. Conversely, in a proprietary system, there is typically only a need for a single dispatch communication controller. Therefore there is a need for a means by which subscribing organizations can patch together talk groups, even though they are only subscribers, and not the operators of the communication system.

DETAILED DESCRIPTION OF A PREFERRED EMBODIMENT

Figure 1:
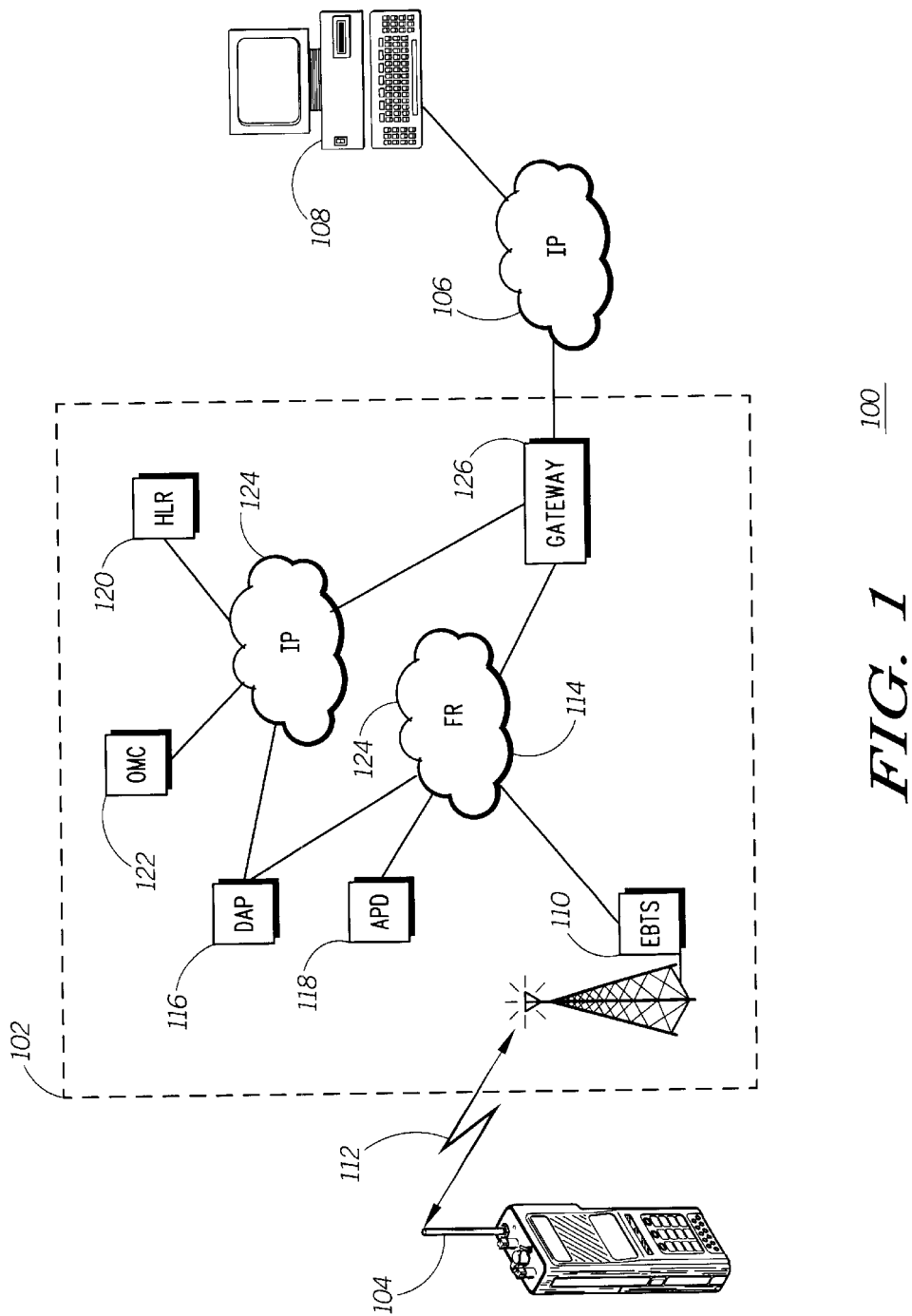
FIG. 1 shows a block diagram of a communication system with a link to a console for patching together dispatch calling parties, in accordance with the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of the inability of a subscribing organization to patch individuals and talk groups together in a subscriber communication system by providing an interface into the communication system for the subscribing organization. The interface allows the organization to operate a console that can interact with the communication system equipment, and behave like a subscriber device, and to also act as a bridge between talk groups. The console is operated by the subscribing organization and is treated as a subscribing mobile communication device by the communication system. The console is treated as a member of the subscribing organization's talk groups, as well as an individual subscriber. When it is desired to join parties together, anytime information is received from one party, it is forwarded back to the communication system by the console. A party can be an individual subscriber, a talk group, or a combination thereof. The console also forwards the identifier of the device transmitting the information so that the user can be identified by the other party. In the event that a collision occurs, the console is able to preempt calls so that only a preferred user, or the first user to initiate a call, will control conjoined parties. That is, if two different parties that have been patched together at the console initiate a call, or request to talk at the same time, or substantially the same time, the console will arbitrate control of the patched parties in a manner prescribed by the console automatically, or by an operator.

Referring now to FIG. 1, there is shown a block diagram 100 of a communication system 102 with a link to an external console 108 for patching together dispatch calling parties, including individual, talk groups, and combinations thereof, in accordance with the invention. The communication system provides dispatch communication service for subscribing mobile communication devices, such as mobile communication device 104. By dispatch communication it is meant a half-duplex mode of communicating that has a very short call set-up latency. It is similar to trunked two-way radio systems. In subscriber dispatch communication systems a subscriber can private call another subscriber, so only the target subscriber can hear the initiating subscriber's voice. A subscriber can also be a member of a talk group. A talk group is defined as a group of subscribers where, when one member talks, all other available members hear the speaking member. As is conventional, a mobile communication device accesses a base station 110 over an air interface 112. The base station establishes a serving cell in the vicinity of the base station. The base station is connected to other components of the wireless communication system by network, such as a frame relay network 114. Although not shown here, for telephone communication a mobile switching center (MSC) with a connection to the public switched telephone network (PSTN) is conventionally used, and would also be connected to the frame relay network.

Dispatch communication control is performed by a dispatch application processor (DAP) 116, and dispatch communication is facilitated by an advanced packet duplicator (APD) 118. The DAP also supports an internet protocol (IP) interface so that it can communicate with a home location register (HLR) 120 and an operations maintenance center (OMC) 122 over an IP network 124. Furthermore, in accordance with the invention, the DAP supports an interface to a gateway 126 which allows connection to a wide area packet network, such as the Internet 106. The DAP controls registration and some aspects of mobility management, and also talk group control. The DAP also provides call set-up and control functions for dispatch calls, such as providing the speaker an alert when the channel is ready.

The gateway 126 provides an internet access point for the console 108, which is located outside of the communication system. The console will be located at the subscribing organization's place of business. The gateway is a fully managed network element, and is managed by the OMC 122. The gateway supports registration of the console, security authentication of the console, and call processing of dispatch calls. Furthermore, in the preferred embodiment, the gateway provides transport layer security for privacy and security between the gateway and the console. The gateway and the DAP interact much the way the DAP and the base station 110 interact. In effect, the console is treated like a subscriber device. As such, it must register for service, be authenticated, and it participates in calls the way a mobile communication device does. The OMC provides configuration information about the gateway to the DAP and APD 118 so that the gateway and the DAP and APD properly interact, and so that the gateway properly interacts with the console, or plurality of consoles as the case may be. The console itself is a computer device comprising a central processing unit, memory, storage memory, and interface means. The console may be comprised of several computers networked together. The console also comprises software to facilitate management of talk groups, interacting with the wireless communication system, and for displaying information to the operator, or dispatcher.

The invention operates by allowing the console to bridge together individuals and talk groups. That it, several individuals may be patched together into a talk group, or just two individuals may be patched together when they are under control of different dispatch communication controllers, or talk groups may be patched together, or individuals and talk groups may be patched together. The console is provided with information regarding the parties, the membership of the various talk groups under its control, and information, including network information of the different DAPs supporting the various talk groups. This allows the console to patch together parties controlled by different dispatch communication controllers, and different DAPs by communicating with the different DAPs. The dispatcher patches parties together by means of dispatch application control software, giving an indication of which parties are to be patched. When a subscriber initiates a call, the console receives call information. Call information includes signaling information, audio packets, the identifier of the initiating subscriber, and combinations thereof. Different types of call information may be transmitted during different parts of the call. For example, while the call is being set up, primarily signaling information is being transmitted. Once the call is set up, audio packets are transmitted and the call identifier of the transmitting subscriber is included with the audio packets. The call identifier of the subscriber presently transmitting in a given dispatch call is referred to as the push-to-talk identifier (PTT ID). The console immediately forwards the call information to the DAP or DAPs controlling the other party or parties. It may be the same DAP that controls the first party, if at least one of the parties is a talk group, or it may be a different DAP. The control message indicates the console is forwarding information for the initiating subscriber, and includes the initiating subscriber's PTT ID.

Figure 2:
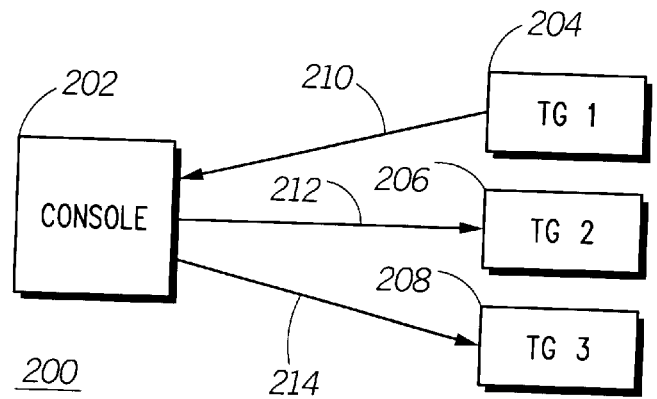
FIG. 2 shows a block diagram of a console while patching together several dispatch calling parties in a dispatch call, in accordance with the invention.

Referring now to FIG. 2, there is shown a block diagram 200 of a console 202 while patching together several parties for a talk group call, in accordance with the invention. The parties may be talk groups TG1 204, TG2 206, and TG3 208, or they may be individuals, or individuals. The parties may be controlled by one dispatch communication controller, or they may all be controlled by different dispatch communication controllers. For clarity, the parties will be assumed to be talk groups here. A subscriber in a first talk group, TG1, initiates a talk group call, and call information is sent to the console 202 by the wireless communication system, via the gateway and internet (210). The console, since it is treated like a subscriber, and as a member of the various talk groups it administers, first receives a page indicating a dispatch call is being set up. The console then responds to the page so that once the call commences, call information will be forwarded to the console. The console forwards the call information to additional talk groups TG2 and TG3 (212, 214). Initially, the identity of the subscriber speaking may be unknown, as when the call is first being set up. The console initiates a talk group call in the additional groups via a control message. The PTT ID of the originating subscriber of the first talk group is forwarded with the call information when it becomes known. Alternatively, the console could wait for the dispatch call to commence, and thereby obtain the PTT ID of the calling party, before commencing with the second dispatch call to the second dispatch calling party. After the dispatch call is set up in each of the additional talk groups, the console is notified, and the console then commences forwarding the audio information it is receiving from the first dispatch call. Once the subscriber in the first talk group finishes speaking, then any subscriber in any of the talk groups may respond. However, with more subscribers being included in the super group formed by patching together talk groups, there is an increased chance of collisions, and since the talk groups may be administered by different dispatch communication controllers, the different dispatch communication controllers would not detect the collision. Therefore the console must be able to arbitrate among the talk groups.

Figure 3:
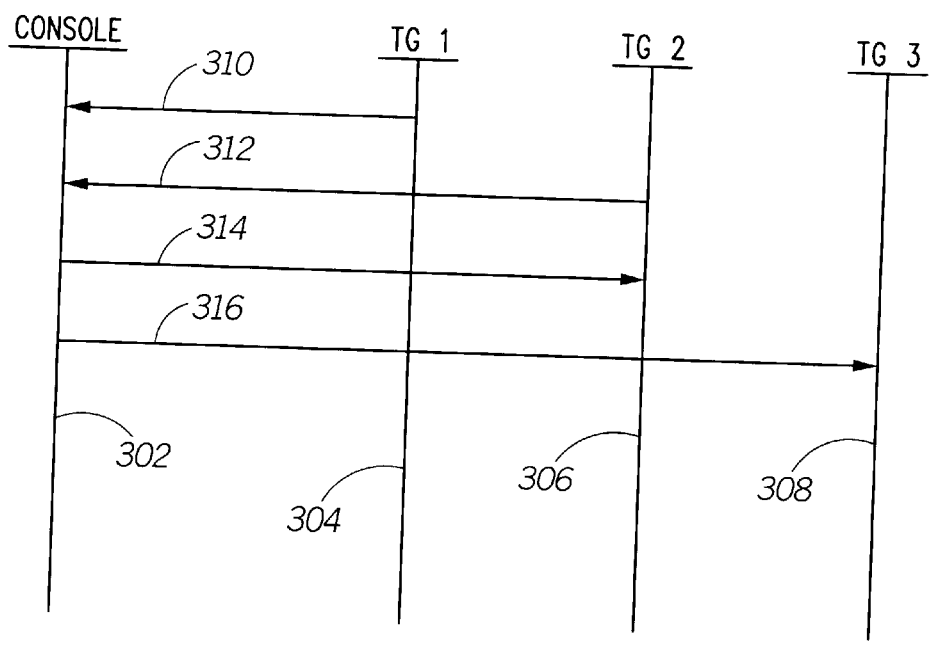
FIG. 3 shows a signal flow diagram of a console performing arbitration among dispatch calling parties, in accordance with the invention.

Referring now to FIG. 3, there is shown a signal flow diagram of a console performing arbitration among dispatch calling parties, in accordance with the invention. The operator of the console can decide on arbitration rules, but for the sake of example, the easiest rule is the first subscriber to initiate a dispatch call will control the super group. By super group, it is meant the collective parties, individuals and talk groups, that are patched together by the console. For example, the console 302 receives call information (310) from a subscriber in a first talk group 304. At this time a talk group call has been set up by the dispatch communication controller administering the first talk group. Shortly thereafter, a second subscriber in a second talk group 306 also initiates talk group call 312. Since it is up to the console, and not the dispatch communication controllers to administer the super group, the dispatch communication controller administering the second talk group simply sets up the second talk group call as is conventionally done. The subscriber device initiating the second talk group call receives a start message from the dispatch communication controller administering the second talk group call. However, the console detects the collision, and sends a control message to the dispatch communication controller administering the second talk group call to override the subscriber that initiated the second talk group call, and to set up a new talk group call in the second talk group with the forwarded talk group call information from the first talk group. Thereafter the console forwards the call information from the first talk group to the second talk group (314), and also to any additional talk groups, such as a third talk group 308, via 316.

It should be noted that in dispatch calling a new dispatch call circuit is not necessarily set up each time a new subscriber in the call begins transmitting. The wireless communication system allows the call to remain set up after a subscriber ceases transmitting for a period of time. During that time other subscribers may respond, sending in a CONTINUE message, thereby using the same dispatch call circuit that has already been set up for those parties. When one subscribes releases their PTT button, an OPEN CHANNEL message is transmitted to the other dispatch calling parties, indicating that they can now respond. Therefore there can be a distinction between new transmitting parties, and parties continuing a call. Furthermore, it is contemplated that the dispatcher, operating the console, can become the next speaker, or even originate a patched dispatch call. The dispatcher has the power to override all presently active calls at any time.

Thus, the invention provides a method of patching together a plurality of dispatch calling parties from a console where each of the dispatch calling parties is in a wireless communication system. The console is treated as an individual subscriber, and is included as a member of each of the talk groups. The console is operably connected to the wireless communication system via an internet protocol interface. As the console begins receiving call information from a first dispatch calling party for a first dispatch call. The call information is received over the internet protocol interface and includes an identifier of the first talking member in the first dispatch calling party. The console then commences forwarding the call information back to the wireless communication system over the internet protocol interface for use in by a second dispatch calling party. In addition to a second dispatch calling party, the console may commence forwarding the call information back to the wireless communication system for use in a third dispatch calling party., as well as additional dispatch calling parties. When the console is receiving call information from an additional dispatch calling party, the console must perform arbitration. In response, the console then commences sending, to the wireless communication system, a control message for each additional dispatch calling parties trying to initiate a call after the first dispatch call is initiated. The control message causes the wireless communication system to stop the subscriber(s) of the additional dispatch calling parties from further transmitting call information. Subsequently those members will start receiving the call information from the first dispatch calling party.

From the communication system perspective, the invention provides a method of patching together a plurality of dispatch calling parties in a wireless communication system, as directed by a console located outside the wireless communication system and operably connected to the wireless communication system via an internet protocol interface. When the dispatch calling party is a talk group, Each of the plurality of talk groups having talk group members identified in a talk group record stored in the wireless communication system. The method commences upon receiving, from a first dispatch calling party, call information for a first dispatch call. That is, when a subscriber commences a first dispatch call. The dispatch communication controller that administers the first dispatch calling party then begins commencing a first dispatch call for the first dispatch calling party, and forwarding the call information for the first dispatch calling party to the console. The console bridges the dispatch calling parties together and sends information back to the wireless communication system. The wireless communication system is then receiving, from the console, call information for a second dispatch calling party that includes the call information for the first dispatch call. The wireless communication system begins commencing a second dispatch call for the second dispatch calling party with the call information from the first dispatch call. It should be noted that, while there is a slight latency in the system, in the preferred embodiment the first and second dispatch calls commence substantially simultaneously. Here, substantially simultaneously means the latency is reduced to a level that is practical, as determined empirically if necessary. If additional dispatch calling parties are joined, the wireless communication system would be receiving, from the console, call information for a third dispatch calling party that includes the call information for the first dispatch call, including an identifier of the first talking member in the first dispatch calling party. To set up the third dispatch call the dispatch communication controller that administers the third dispatch calling party begins commencing a third dispatch call for the third dispatch calling party with the call information from the first dispatch call. In the preferred embodiment, the first, second, and third dispatch calls commence substantially simultaneously. If the wireless communication system begins receiving call information for at least one additional dispatch calling party while receiving the call information for the first dispatch calling party in order to commence an additional dispatch call, then arbitration will be necessary when the additional dispatch calling party is patched to the first dispatch calling party. The wireless communication system commences forwarding the call information from the at least one additional dispatch calling party to the console. The console processes the information, and decides the first dispatch calling party has priority, and so the wireless communication system begins receiving from the console a control message indicating the additional dispatch call is to be overridden by the console. The wireless communication system then beings transmitting to the member of the additional dispatch calling party a control message to release a channel in which the additional dispatch call was commencing. The dispatch communication controller administering the additional dispatch calling party the begins commencing a dispatch call for the additional dispatch calling party with the call information from the first dispatch call.

Figure 4:
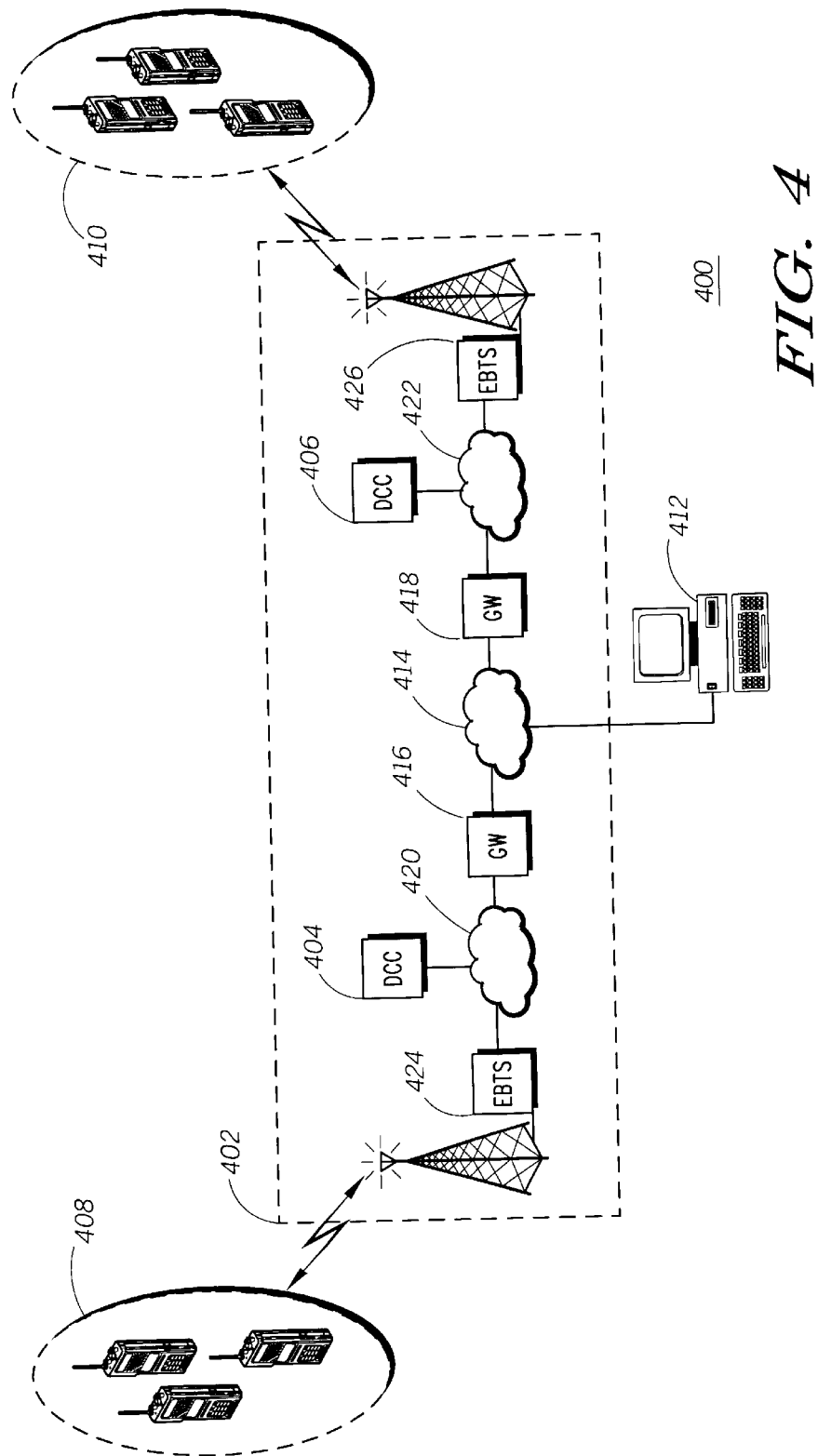
FIG. 4 shows a block diagram of a communications system having multiple dispatch communication controllers supporting multiple dispatch calling parties that are patched together by an external console, in accordance with the invention.

Referring now to FIG. 4, there is shown a block diagram 400 of a communications system 402 having multiple dispatch communication controllers 404, 406 supporting multiple dispatch calling parties 408, 410 that are patched together by an external console 412, in accordance with the invention. As described before, the console communicates with the wireless communication system preferably over the Internet 414, via one or more gateways 416, 418. Some wireless communication systems are quite large, covering all metropolitan areas of a country. Different regions of the wireless communication system may have their own gateway. Each gateway is connected to a network 420, 422, to which the different dispatch communication controllers 404, 406 are connected. This allows the console to send messages to the dispatch communication controllers via the gateway. The gateways behave much like base stations 424, 426 in their interaction with the console and dispatch communication processors. Thus, the console can patch together dispatch calling parties located in different regions, and administered or controlled by different dispatch communication controllers. When call information is received from a first dispatch calling party such as talk group 408, the console participates in the talk group call much the way a regular member of the first talk group would, but also initiates a second talk group call in a second talk group 410 by forwarding the call information of the first talk group to the second talk group. Because the PTT ID information is forwarded also, members of the second talk group will know the identity of member of the first talk group.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of patching together a plurality of dispatch calling parties from a console, each of the dispatch calling parties being subscribed to a wireless communication system providing dispatch calling service, the method comprising:

providing the console as a subscriber to the wireless communication system and being operably connected to the wireless communication system via an internet protocol interface;

receiving, at the console, call information from a first dispatch calling party for a first dispatch call on a first dispatch call circuit, the call information being received over the internet protocol interface and including an identifier of a first talking member of the first dispatch calling party;

forwarding the call information from the console back to the wireless communication system over the internet protocol interface for use in a second dispatch call on a second dispatch call circuit; and arbitrating communication between the first and second dispatch call circuits, performed by the console.

2. A method of patching together a plurality of dispatch calling parties as defined in claim 1, further comprising forwarding the call information from the console back to the wireless communication system over the internet protocol interface for use in a third dispatch call on a third dispatch call circuit.

3. A method of patching together a plurality of dispatch calling parties as defined in claim 1, wherein the receiving includes receiving call information from at least one additional dispatch calling party, the method further comprising sending, to the wireless communication system, from the console over the internet protocol interface, a control message for the additional dispatch calling party, and wherein the control message causes the wireless communication system to stop the additional dispatch calling party from further transmitting call information.

4. A method of patching together a plurality of dispatch calling parties in a wireless communication system, the method comprising:

receiving from a first dispatch calling party call information for a first dispatch call at the wireless communication system, the call information including an identifier of a first talking member in the first dispatch calling party;

commencing a first dispatch call on a first dispatch call circuit for the first dispatch calling party, performed by the wireless communication system;

forwarding the call information for the first dispatch call to a console located outside the wireless communication system and operably connected to the wireless communication system via an internet protocol interface, the console acting as a subscriber to the wireless communication system, the forwarding performed by the wireless communication system;

receiving at the wireless communication system from the console call information for a second dispatch calling party that includes the call information for the first dispatch call;

commencing a second dispatch call on a second dispatch call circuit for the second dispatch calling party with the call information from the first dispatch call; and arbitrating communication between the first and second dispatch call circuits, performed by the console.

5. A method of patching together a plurality of dispatch calling parties in a wireless communication system as defined in claim 4, further comprising:

receiving from the console call information for a third dispatch calling party that includes the call information for the first dispatch call including an identifier of a first talking member in the first dispatch calling party; and commencing a third dispatch call on a third dispatch call circuit for the third dispatch calling party with the call information from the first dispatch call;

wherein the first, second, and third dispatch calls commence substantially simultaneously.

6. A method of patching together a plurality of dispatch calling parties in a wireless communication system as defined in claim 4, further comprising:

receiving call information for at least one additional dispatch calling party while receiving the call information for the first dispatch calling party, the call information for the at least one additional dispatch calling party being sent by a member of the at least one additional dispatch calling party in order to commence an additional dispatch call;

forwarding the call information from the at least one additional dispatch calling party to the console;

receiving from the console a control message indicating the additional dispatch call is to be overridden by the console;

transmitting to the member of the at least one additional dispatch calling party a control message to release a channel in which the additional dispatch call was commencing; and commencing a dispatch call for the at least one additional dispatch calling party with the call information from the first dispatch call.

* * * * *